United States Patent Office 3,396,802
Patented Aug. 13, 1968

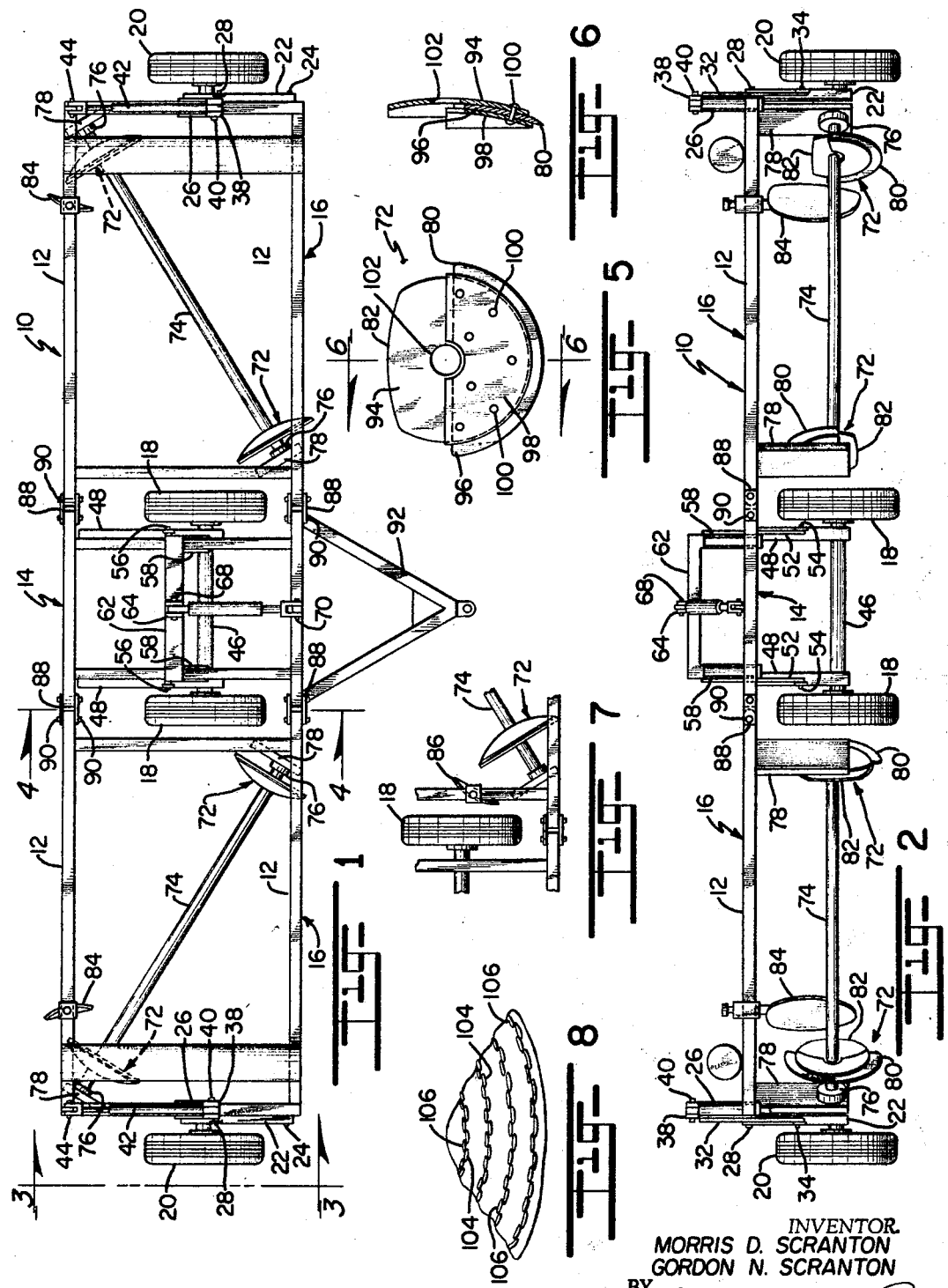

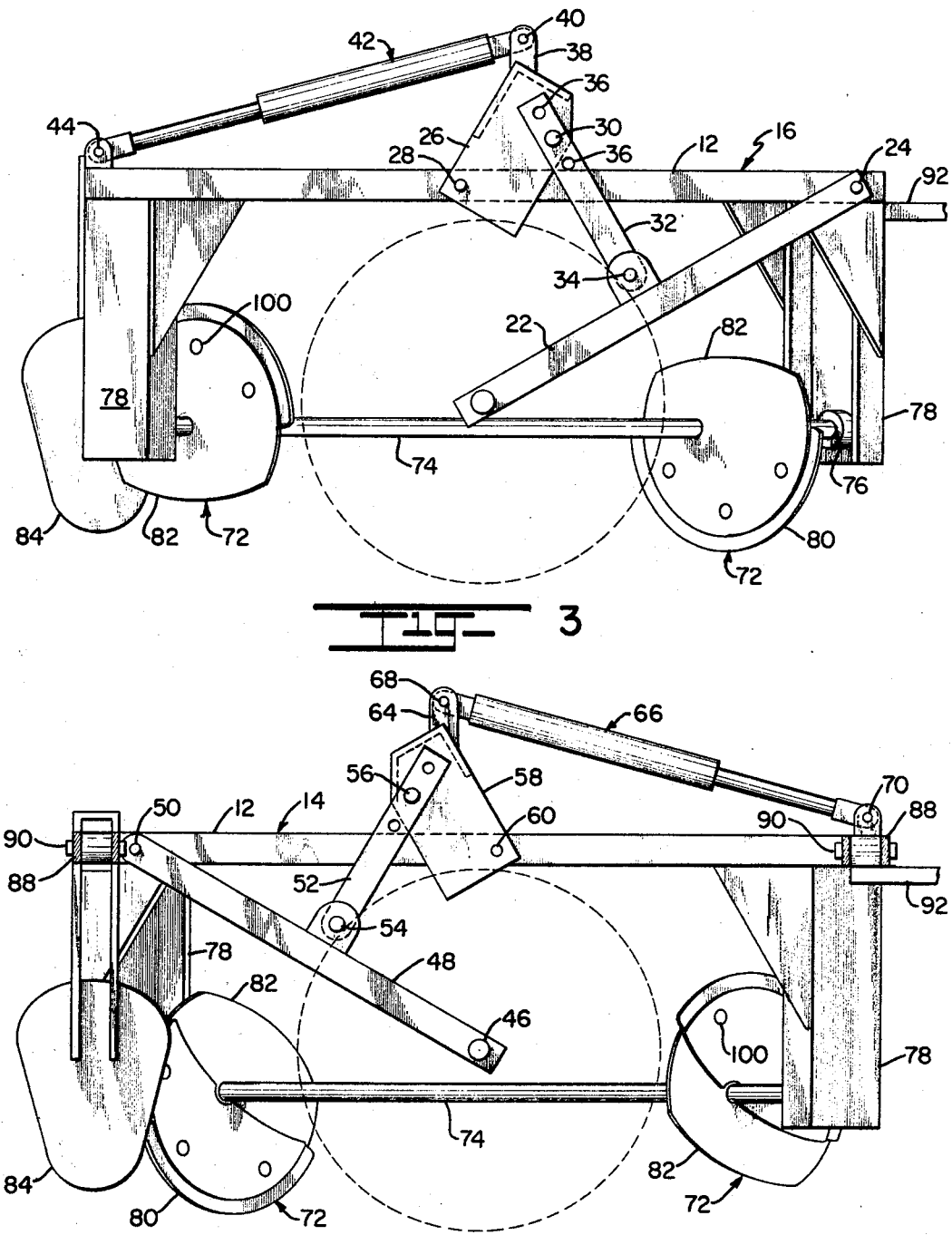

3,396,802
RUN-OFF CONTROL AND METHOD AND
APPARATUS FOR MAKING
Morris D. Scranton and Gordon N. Scranton,
both of Lamar, Colo. 81052
Filed Nov. 23, 1964, Ser. No. 413,141
18 Claims. (Cl. 172—1)

ABSTRACT OF THE DISCLOSURE

The invention comprises apparatus for use in conservation of rainfall in semiarid agricultural areas and comprises a pit digger operative when pulled by a tractor to dig at least two transversely spaced rows of longitudinally separated water receiving pits with pits in adjacent rows being staggered, and to pile the dirt from each pit in a dike or dam extending longitudinally between the pit and the next pit to be dug, the purpose of the dike being to divert rain water into the pits adjacent its ends.

---

This invention lies in the field of control and retention of the run-off water resulting from rain and melting snow on rolling pasture or grass land. It is directed particularly to a novel surface configuration which traps substantially all run-off water, and to a method and apparatus for producing such configuration.

The great plains area of the United States contains a tremendous amount of pasture land which appears to be generally level as compared with hills and mountains. However, when considered locally, a very large proportion of it is rolling country sloping in all directions at random. Long dry spells bake the surface and harden it so that the rate of water absorption is quite low. When sudden hard showers occur, most of the water runs downhill unchecked and largely unabsorbed, eventually finding its way into streams and being lost to the pasture land on which it fell. Shallow downhill depressions rapidly become gullies which drain the adjacent land even more rapidly. Frequently the snow melts very rapidly and is lost in the same way.

Contour plowing is one remedy for this situation but it has disadvantages. It is difficult and expensive because it involves turning over a major portion of the land. It is undesirable because this results in disturbing a major portion of the rooted grasses which in turn greatly reduces the crop. The contour lines must be maintained with great accuracy with respect to altitude because furrows which slope continually for any appreciable distances become watercourses during a heavy rain, and the water at the low points overflows and goes down the hill, making new gullies.

Another remedy is known as pit digging. This consists in digging a multitude of lines of pits, usually by using eccentrically mounted disks which produces semiovoid depressions. This arrangement traps and holds the water which runs into the individual pits but it also has disadvantages. The pits, of course, are usually dug rather closely along contour lines to provide a partial barrier. When they are spaced apart along the contour lines water runs between them and quickly creates ditches which drain off a large part of the water which would normally run into the pits.

The solution to this problem has been to place rows rather close together and stagger the pits, as disclosed in the patent to Krause, No. 2,229,746. This is only a partial solution, for there are adequate paths still remaining between the pits, and the marginal mound thrown up around each pit by the digger diverts water to the run-off paths. The ultimate step in this direction is to retain the staggered arrangement but to locate the rows so close together that the pits practically touch each other as disclosed in the patent to Benjamin, No. 2,136,607. This again is unsatisfactory because it is difficult and expensive and it disturbs almost 100 percent of the land, thus greatly reducing the crop.

A solution which would positively trap and retain practically the entire run-off, with very little difficulty and expense and with minimum disturbance of the land, is highly desirable because the grass crop would be increased by about 30 percent, which is equivalent to that much added grazing land for the ranch. Such a solution is offered by the present invention. The altered configuration of the land comprises long continuous rows of pits, preferably elongated, spaced apart substantial distances along the rows, the major part of the mass of material removed from a given pit being laid on the undisturbed ground in a line between that pit and the succeeding pit to form a dike.

The dike is complete from pit to pit and generally overlaps the adjacent ends. Considering one row, it will be seen that some of the water approaching the row will fall directly in the pits and the remainder of the water, instead of flowing between the pits, will be diverted by the dikes into adjacent pits. Thus, practically none of the water is lost. It is preferable to follow contour lines but accuracy is not essential because there is no continuous downhill flow path to allow accumulation of an excess of water at low points. It has been found that retention is such that the rows can be spaced apart a distance equal to about five times the lateral width of the pits, with the result that only 10 percent or less of the land need be disturbed to establish 100 percent control of the run-off.

The apparatus which accomplishes this result is simple but effective. In one of its preferred forms it comprises a frame adapted to be towed by a tractor and carrying one or more, preferably four cutters to dig a series of spaced pits as the frame moves forward. The cutters have cutting edges which alternately descend into the ground to displace a mass of material and ascend to ground level or higher to leave a strip undisturbed. These may be plow blades mounted and actuated to rise and fall with respect to the frame but at present it is preferred to use disk-like elements mounted on rotating shafts. The cutting edge portion of each extends radially farther from the shaft than does the remainder of the periphery so that, in rolling, the element alternately digs and clears.

Laterally adjacent but spaced from the trailing portion of each cutter is a fender arranged to form with the cutter a pocket which gathers the material displaced laterally by the cutter and carries it forward. During the non-cutting phase when the cutter clears the ground this material is laid down on the surface in a line extending from one pit to the next to form a dike between them. The fenders may all be shield shaped devices but in one form of the apparatus a cutter is located adjacent one of the ground wheels which then serves as a fender to operate in the manner described. When a plurality of cutters are mounted on one frame they are spaced apart laterally a distance of about five times the effective cutting width of the cutter so that the rows will be properly spaced apart as described above.

Various other advantages and features of novelty will become apparent as the description proceeds in conjunction with the accompanying drawings in which:

FIGURE 1 is a top plan view of one preferred form of the apparatus in accordance with the invention;

FIGURE 2 is a front elevational view of the apparatus of FIGURE 1;

FIGURE 3 is a view taken on line 3—3 of FIGURE 1;

FIGURE 4 is a view taken on line 4—4 of FIGURE 1;

FIGURE 5 is a front elevational view of a preferred form of cutter for use in the apparatus;

FIGURE 6 is a sectional view taken on line 6—6 of FIGURE 5;

FIGURE 7 is a fragmentary plan view of a modified arrangement of a front cutter with a fixed fender; and FIGURE 8 is a perspective view of a small area of rolling land with the run-off control configuration of the invention.

The apparatus in general, as seen in FIGURES 1 and 2, includes a generally horizontal and planar frame 10 made of channel or tubular members 12 and divided into a center section 14 and symmetrical side sections 16. The center section is supported by a pair of ground wheels 18 and each side section is supported at its inner end by its connection to the center section and at its outboard end by a wheel 20. All of the wheels include conventional center disks, rims, and tires, and their side faces are generally concave.

It will be seen from FIGURE 3 that wheel 20 is rotationally mounted on main strut 22 which is pivotally mounted at its upper end to frame section 16 at 24. A bell crank 26 is pivotally mounted to the frame section at 28 and carries pivot 30. A drop link 32 is pivotally connected to the bell crank at 30 and to the strut 22 at 34. The upper end of link 32 is provided with a plurality of apertures 36 for adjustable connection to pivot 30. The upper end of bell crank 26 includes a horn 38 pivotally connected at 40 to a retracting strut 42 which in turn is pivotally connected to the frame at 44. The cylinder of the strut is connected in a conventional manner by hydraulic lines to a source of hydraulic power, not shown, under the control of the operator, who can extend and retract the strut to raise and lower the wheel 20 in known manner. Wheel 20 at the opposite end of the frame is mounted and actuated in the same manner as the wheel just described.

By reference to FIGURE 4 it will be seen that ground wheels 18 are attached and operated in substantially the same manner, with a few minor variations. Wheels 18 are mounted on a cross axle 46 which is connected to the lower ends of main struts 48, the upper ends of which are connected pivotally at 50 to the rear portion of frame 14. Drop link 52 is pivotally connected at 54 and 56 to the main struts and to bell cranks 58 respectively. The latter are pivotally connected to the frame at 60.

The two bell cranks are rigidly connected to a cross bar 62, best seen in FIGURE 2, from which horn 64 projects upwardly. Retract strut 66 is pivotally connected at one end to horn 64 at 68 and at the other end to the frame at 70, and is connected by hydraulic lines to a source of hydraulic power, not shown, under the control of the operator. The lines are so connected that all of the wheels 18 and 20 may be raised and lowered together.

In the presently preferred form of the invention the cutters are basically cultivator type disks 72, described in detail hereinafter, having cutting edges on their peripheries which extend radially farther from their axes than do the rest of their peripheries so that in rotating rolling motion during forward translation they will alternately dig pits and clear the surface. These disks or blades, which may be identical, are mounted as best seen in FIGURE 1 close to the opposite ends of axle shafts 74 which are arranged in a generally horizontal plane and in directions diagonal to the path of travel. The shafts may diverge forwardly or converge forwardly as shown, the latter being preferred for reasons which will be explained subsequently.

Shafts 74 are mounted for rotation in bearings 76 which are rigidly mounted on depending brackets 78 secured to appropriate parts of frame sections 16 as illustrated. Each blade is fixed to its shaft for rotation therewith and the blades on each shaft are mounted so that their cutting edges 80 are diametrally opposed. When the apparatus is moved along the ground the cutting edge 80 of one blade extends beneath the surface and digs a pit while the clearance portion 82 of the other blade on the same shaft travels along at ground level or higher, depending on the adjustment of the ground wheels.

Since the blades are set at an angle, the drag of the cutting edge will cause rotation of the cutter-shaft assembly. As it emerges, the cutting edge of the other blade begins to dig and continues the rotation so that it is continuous and self powered. It will be seen that raising or lowering the wheels conversely lowers or raises the frame together with the cutters and their shafts. By this means the operator can closely control the depth of the pits which are formed.

The cutters are dished or concavo-convex with their concave sides facing forwardly and are set at an appreciable angle to the path of forward travel. With this construction and arrangement each cutter would normally move the displaced mass upwardly, rearwardly and laterally and would deposit it in an elongated mound beside the pit as it is formed. Such a result, which is produced by prior art devices, would be entirely unsatisfactory for the intended purpose because the gaps between pits would allow the escape of a large proportion of the run-off and, if the mounds are formed on the up-hill side of the pits they will even divert the water which would otherwise flow into the pits. This problem is completely overcome by the novel construction disclosed herein.

Located laterally adjacent but spaced from the trailing portion of each of the rear cutters as seen in FIGURE 1 is a depending, fixedly mounted, shield-shaped fender 84, well illustrated in FIGURE 4. The fender is preferably dished, with its concave face opposing the concave face of the cutter. This fender cooperates with its cutter 72 to form an open-ended forwardly divergent pocket which receives the mass of material and moves it forward as each pit is dug. When the cutter rises to a clearance position and momentarily no more material is being fed to the pocket, the latter then lays down the contained material in a linear mound extending across the gap from the end of one pit to the beginning of the next, thus forming a complete dike which will divert water to one or the other of the adjacent pits. If the ground being worked is in the form of sod held together by root formations, the mass will be raised, overturned, and dropped in place as a unit.

The forward cutters 72 are located laterally adjacent but spaced from the ground wheels 18 which have generally concave side faces typical of conventional automobile wheels. They cooperate with their cutters in the same way to receive, carry forward, and deposit the displaced mass of material in the form of dikes.

In the modification shown in FIGURE 7, the cutters are spaced farther from wheels 18, and fenders 86 are mounted in a position corresponding to the position of fenders 84 with respect to the rear cutters. It will be obvious that they will act in the same way.

While the entire frame may be constructed as a single rigid unit from end to end, it is preferred to articulate the side sections to the center section. For this purpose brackets 88 are rigidly secured to the center section 14 by bolting or welding, and the side sections are connected to the bracket by pivot pins 90 to swing about a generally horizontal fore and aft axis. With this construction the center section is supported substantially horizontally by its two ground wheels 18 while each side section is free to independently rise and fall to follow the contours of uneven ground.

As mentioned previously, it is preferred to arrange the assembly with axle shafts 74 converging forwardly as shown. When thus arranged, each cutter produces a drag which has equal components outward from the center and rearward when the apparatus is drawn forwardly by a tractor or other towing device connected to its tow-frame 92. The resultant of the components stabilizes the apparatus so that it follows the tractor in a straight line with no tendency to wander.

The cutter construction is shown in detail in FIGURES 5 and 6. It includes a main support plate 94 in the general form of a concavo-convex disk with a segment of its periphery removed at one zone, as at 82, a generally semi-circular cutter blade 96 of somewhat larger radius mounted on the plate at the diametrally opposite zone, and a semi-circular reinforcing and clamping plate 98 overlying the cutter blade, all of said elements being removably secured together by bolts 100. The cutting edge 80 of blade 96 is hardened, wear resisting steel to protect the other parts from damage when encountering rocks or the like. If it becomes worn or broken it can be readily replaced because of the demountable construction. Plate 94 is provided with an aperture 102 for mounting on shaft 74. While it can be furnished with a hub for a bolted connection it is preferred to weld it in place. Although the elements of the cutter are shown as being circular in form, they may take other shapes which will accomplish the intended purpose.

The assembly has been described with reference to disk type cutters mounted on rotating shafts because the construction is simple and accomplishes the purpose with a minimum number of moving parts. However, it will be apparent that cutters of a general plow blade formation could be used together with links, levers, and driving means to raise and lower them at the proper times to produce the desired longitudinally spaced pits.

The parameters of the apparatus and its operation may be varied within reasonable limits depending on the type of soil and the prevailing weather conditions. For most purposes highly satisfactory results have been attained with an apparatus using cutter disks having a maximum radius of about 10 inches and mounted with a lateral spacing of about five feet, cutting pits about one foot wide at the surface. The pits are three to four feet long and the gaps from two to three feet. Since the dikes are formed from the material displaced from the pits, they tend to be longer than the gaps so as to overlap the pit ends. The dikes are slightly offset, lying generally in a line along one of the pit margins. With the combination described, a forward speed of about three to three and a half miles per hour produces very good results, laying the dikes quite accurately in the desired positions.

The perspective view in FIGURE 8 illustrates the surface configuration resulting from the use of the apparatus as described. Pits 104 are spaced along continuous lines which should follow the contour fairly closely. Dikes 106 extend across the gaps between the pits and overlap them to some extent. It will be seen that any water running down the hill will encounter either a pit or a dike. Either it will run directly into a pit or it will be diverted by a dike into a pit. Thus no water can escape. Although a contour line arrangement is preferable it can be seen that even if these barriers are formed at a fairly long downhill angle they will still be effective because water striking them at an acute angle will still be trapped. No elongate flow path is formed and hence there is no tendency to develop ditches or gullies. It has been determined that with pits one foot wide the rows can be as much as five feet apart and still trap all the water resulting from any but the most unusual conditions. Therefore only 10 percent or less of the land is disturbed, which is very important where there is already a substantial amount of grass growing.

It will be apparent to those skilled in the art that various changes and modifications may be made in the invention as shown and described without departing from the spirit of the invention, and it is intended that all such changes and modifications shall be embraced within the scope of the following claims.

We claim:

1. Apparatus for tilling land to control run-off comprising: a laterally elongate frame including a center section and a pair of side sections; a shaft rotatably mounted on each of said side sections in a generally horizontal plane with its axis extending diagonally to the fore and aft axis of the frame, the two shaft axes diverging from each other at equal angles to the frame axis; a pair of spaced cutters fixed to each shaft for rotation therewith; each of said cutters comprising a generally disk-like blade having a cutting edge comprising about one half of the periphery and extending radially from the shaft a distance substantially greater than the distance from the shaft of the remainder of the periphery; said cutters being mounted so that their cutting edges are diametrally opposed; the engagement of said cutters with the ground on forward movement of the frame causing rotation of said cutters so that each cutting edge alternately descends into the ground and digs a pit and then rises to a nondigging position as the frame moves forward; said cutters being shaped and arranged to progressively displace laterally the mass of material displaced from each pit as it moves through the ground; and fenders on said frame shaped and arranged to form with each of said cutters an open-ended forwardly divergent pocket to collect and carry forward the major portion of the mass of material as the cutter displaces it during the cutting phase of the cycle; said pocket depositing said mass on the ground in a line during the non-cutting phase of the cycle to produce a dike extending across the gap from one pit to the next.

2. Apparatus as claimed in claim 1; the axes of said shafts extending forwardly and inwardly toward the fore and aft axis of the frame; and a towing member extending forwardly of the center section; the drag of all of said cutters having rearward and outward components to directionally stabilize the apparatus in operation.

3. Apparatus as claimed in claim 1; including ground wheels for supporting said frame; one of said wheels being located laterally adjacent the trailing portion of the forward one of each of said pairs of cutters and serving as the fender therefor.

4. Apparatus as claimed in claim 1; a plurality of laterally spaced wheels to support said frame and jack means to raise and lower said wheels to vary the depth of penetration of said cutters.

5. Apparatus as claimed in claim 1; said center section and said side sections being discrete; pivotal means having fore and aft axes connecting said side sections to said center section; a pair of laterally spaced ground wheels supporting said center section; and a ground wheel mounted adjacent the outboard end of each side section; the articulation of said sections facilitating operation over irregular ground surfaces.

6. Apparatus for tilling land to control run-off, comprising: a frame; a plurality of ground wheels to support said frame; a cutter movably mounted on said frame and having a cutting edge adapted to alternately descend into the ground and dig a pit and then rise to a non-digging position as the frame moves forward; said cutter being shaped and arranged to progressively displace laterally the mass of material displaced from each pit as it moves through the ground; said cutter being located laterally near one of said ground wheels and arranged to form with said wheel an open-ended forwardly divergent pocket to collect and carry forward the major portion of the mass of material as the cutter displaces it during the cutting phase of the cycle; said pocket depositing said mass on the ground in a line during the non-cutting phase of the cycle to produce a dike extending across the gap from one pit to the next.

7. Apparatus as claimed in claim 6; the opposing faces of said cutter and said wheel being concave.

8. Apparatus for tilling land to control run-off, comprising: a frame; a plurality of ground wheels to support said frame; a shaft rotatably mounted on said frame in a generally horizontal plane with its axis extending diagonally to the fore and aft axis of the frame; a pair of spaced cutters fixed to said shaft for rotation therewith; each of said cutters comprising a generally disk-like blade having a cutting edge comprising about one half of the periphery and extending radially from the shaft a distance substantially greater than the distance from the shaft of the remainder of the periphery; said cutters being mounted so that their cutting edges are diametrally opposed; the engagement of said cutters with the ground on forward movement of the frame causing rotation of said cutters so that each cutting edge alternately descends into the ground and digs a pit and then rises to a nondigging position as the frame moves forward; said cutters being shaped and arranged to progressively displace laterally the mass of material displaced from each pit as it moves through the ground; and fenders on said frame shaped and arranged to form with each of said cutters an open-ended forwardly divergent pocket to collect and carry forward the major portion of the mass of material as the cutter displaces it during the cutting phase of the cycle; said pocket depositing said mass on the ground in a line during the noncutting phase of the cycle to produce a dike extending across the gap from one pit to the next.

9. Apparatus as claimed in claim 8; one of said fenders comprising a ground wheel.

10. Apparatus as claimed in claim 8; the opposing faces of said fenders and cutters being concave.

11. Apparatus for tilling land to control run-off, comprising: a frame; a plurality of wheels to support said frame at a selected distance above the ground; and digging means carried by said frame to dig a continuing series of spaced pits and build a series of dikes between said pits by forming each dike of material removed from the pit preceding it in the direction of travel of said apparatus; at least a part of said digging means being mounted to alternately enter the ground and dig an elongate pit and then rise to about ground level as the frame moves along a predetermined path; fender means mounted rearwardly of and adjacent to said digging means forming with said part a socket for carrying forward the major portion of the mass of material removed from each pit and depositing said mass of material in a line extending generally from the end of the pit from which it was removed to the beginning of the succeeding pit in the direction of travel of said frame; thereby to establish an elongate run-off control consisting of spaced pits to trap and hold run-off water, and dikes from pit to pit which direct water into adjacent pits, each of said dikes formed of material removed from the pit preceding it in the direction of travel of said apparatus.

12. Apparatus for tilling land to control run-off, comprising: a frame, a plurality of wheels to support said frame above the ground; at least one cutter on said frame having a cutting edge adapted to alternately descend into the ground and dig a pit and then rise to a non-digging position as the frame moves forward; and fender means mounted on said frame rearwardly of and adjacent said cutter and forming therewith a pocket for carrying forward the major portion of the mass of material removed from each pit and depositing it in a line extending generally from the end of the pit from whichi t was removed to the beginning of the succeeding pit to establish a linear barrier to the passage of run-off water.

13. A method of preparing land surfaces to retain run-off water, comprising: digging at least two longitudinal laterally spaced rows of staggered longitudinally spaced pits in a land surface; transporting substantially all of the material removed from each of said pits forwardly of the pit from which it is removed; and depositing said material in the form of a dike extending longitudinally across the gap between the pit from which the material was removed to the succeeding pit substantially parallel with the pits and connecting the ends of said last two mentioned pits.

14. Apparatus for tilling land to control run-off comprising: a frame, a plurality of wheels to support said frame above the ground; at least one cutter movably mounted on said frame and having a cutting edge adapted to alternately descend into the ground and dig a pit and then rise to a nondigging position as the frame moves forward; said cutter being shaped and arranged to progressively displace laterally the mass of material displaced from each pit as it moves through the ground; and a fender mounted on said frame rearwardly of and adjacent to said cutter and being shaped and arranged to form with the portion of said cutter carrying said cutting edge an open-ended forwardly diverted pocket to collect and carry forward the major portion of the mass of material removed from a pit as the cutter displaces said material during the cutting phase of the cycle; said pocket depositing said mass from said last mentioned pit between said last mentioned pit and the following pit in the direction of travel of said apparatus on the ground in a dike extending across the gap from said last mentioned pit to the following pit in the direction of travel of said apparatus.

15. The method as claimed in claim 13; further including the digging of a plurality of lines of pits and depositing dikes therebetween; and locating said lines so that the distance between them is of the order of five times the lateral width of the pits.

16. Apparatus as claimed in claim 14; the mounting for said cutter comprising a rotating shaft; said cutter comprising a generally disk-like blade fixed to said shaft for rotation therewith; the cutting edge comprising about one half of the periphery and extending radiallly from the shaft a distance substantially greater than the distance from the shaft of the remainder of the periphery.

17. Apparatus as claimed in claim 14; the opposing faces of said fender and said cutter being concave.

18. Apparatus as claimed in claim 14; the general plane of said cutter being set at an angle to the direction of forward travel to provide a desired digging width; and said fender being spaced laterally of the trailing portion of said cutter a distance substantially less than said digging width.

References Cited

UNITED STATES PATENTS

| | | | |
|---|---|---|---|
| 1,933,906 | 11/1933 | Hendricks | 172—310 X |
| 2,136,607 | 11/1938 | Benjamin | 172—604 X |
| 2,225,204 | 12/1940 | Benjamin | 172—1 X |
| 2,252,383 | 8/1941 | Lindgren | 172—555 X |
| 2,269,051 | 1/1942 | Cahoy | 172—555 |

FOREIGN PATENTS

| | | |
|---|---|---|
| 125,231 | 8/1947 | Australia. |
| 191,462 | 10/1907 | Germany. |

ABRAHAM G. STONE, *Primary Examiner.*

J. R. OAKS, *Assistant Examiner.*